March 11, 1930.  D. R. SCHOLES  1,749,892
POWER TRANSMISSION GEARING
Filed Dec. 10, 1928
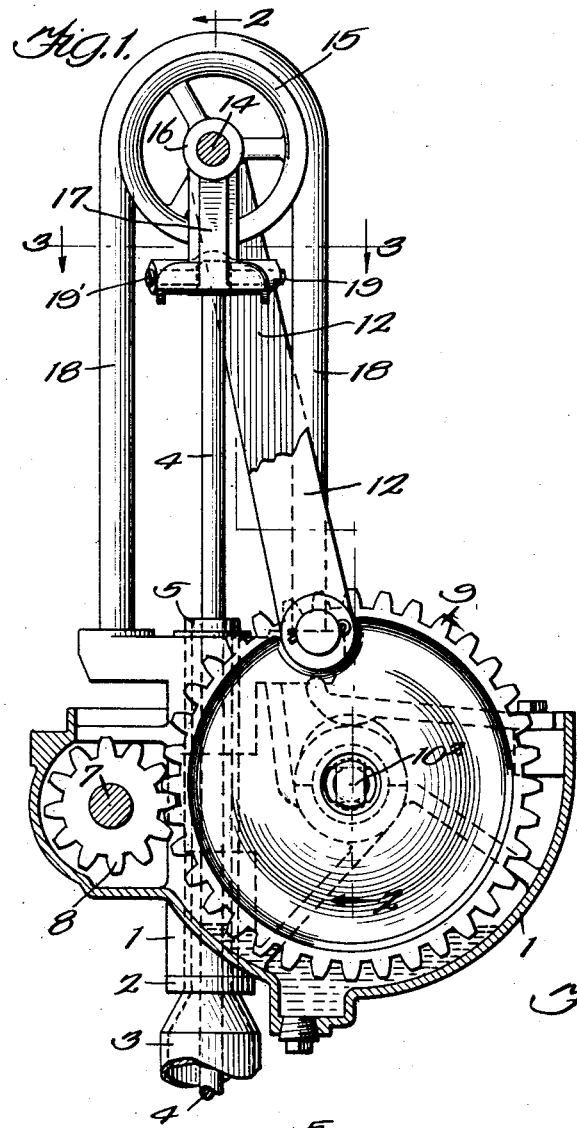
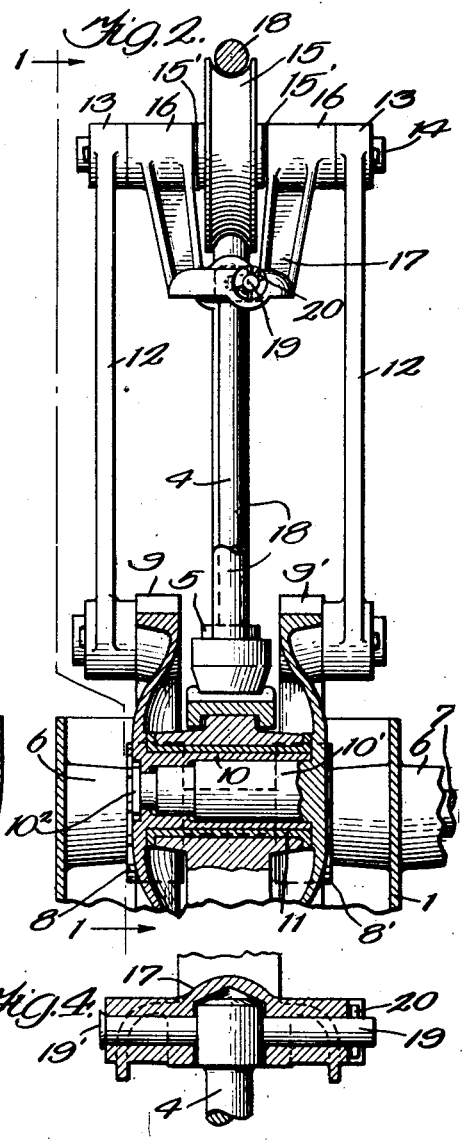
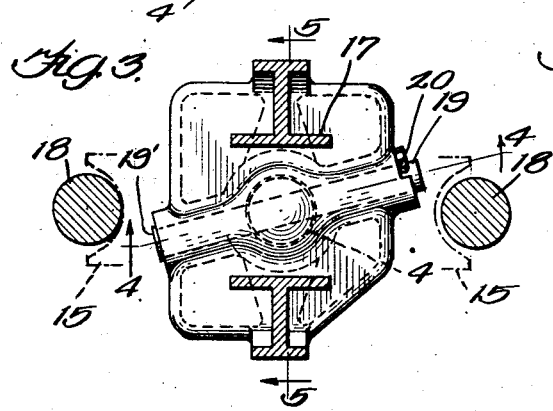
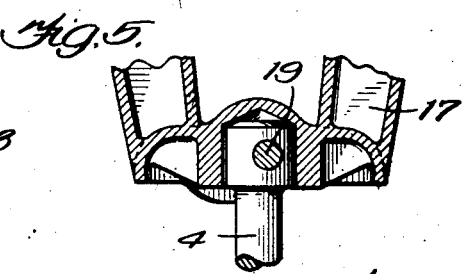
Inventor:
Daniel R. Scholes Patented Mar. 11, 1930

1,749,892

UNITED STATES PATENT OFFICE

DANIEL R. SCHOLES, OF CHICAGO, ILLINOIS, ASSIGNOR TO AERMOTOR COMPANY, OF CHICAGO, ILLINOIS, A CORPORATION OF ILLINOIS

POWER-TRANSMISSION GEARING

Application filed December 10, 1928. Serial No. 325,034.

My invention relates to power transmission mechanism which employs power transmission gearing including two rotating members, two co-extensive and symmetrically related pitmen, each rotating member having a pitman individual thereto and in pivotal connection at one end therewith, a cross-head common to both pitmen and having pivotal connection therewith at the other ends thereof, and a load rod extending along and between the planes of movement of the pitmen. Gearing of this character is commonly included in the construction of wind mills and when thus used the two rotating members mentioned are generally in the form of spur gears which are driven by spur pinions meshing therewith. These pinions, in turn, are provided upon the shaft of the wind wheel whereby the pinions are turned to reciprocate the load rod through the intermediation of the other mentioned parts. A well-known form of wind mill constructed and arranged as described is provided with hubs for the spur gears that are in telescoping and interlocking relation, this relation being maintained by the spur pinions which are in fixed relation with each other. Slight relative rotary movements of the spur gears may arise due to backlash, this slight relative movement of the gears being accompanied by slight rocking movement of the cross-head through the unequal action of the pitman. Such slight movement of the cross-head may also occur due to looseness in other parts of the structure as for example in the connections between the pitmen and spur gears and between the pitmen and the cross-head. The load rod, which generally operates a pump in a wind mill structure, passes between the pitmen and is apt to have its connection with the cross-head strained since the load rod and the cross-head have hitherto been in rigid relation. This result is particularly apt to occur when the cross-head nears and is at the middle of the stroke. For the reason stated the connection between the load rod and the cross-head has frequently been broken. I overcome this objectionable characteristic in wind mills having the structural characteristics described by employing a flexible connection between the cross-head and load rod.

The wind mill of the prior art, above described, has also been inclusive of a peripherally grooved sheave assembled with the cross-head and co-axial with the ends of the pitmen that have pivotal connection with the cross-head. Guide rods were also employed which were received in the peripheral groove of the sheave whereby the load rod was confined to a substantially fixed vertical line of movement. In adapting my invention to a wind mill having these further characteristics I provide a shaft which couples the cross-head and the adjacent end of the load rod and which is positioned and serves to afford an axis of relative movement of the cross-head and load rod that is in a plane that is angular and preferably perpendicular to the planes of movement of the pitman. For purposes of assembly I have disposed this shaft to be sufficiently oblique to the plane containing the aforesaid rods to permit the shaft to be readily inserted in completing the assembly of the parts.

The invention will be explained more fully by reference to the accompanying drawing in which Fig. 1 is an elevation, taken partially in section on line 1—1 of Fig. 2; Fig. 2 is a sectional view on line 2—2 of Fig. 1; Fig. 3 is a sectional view on line 3—3 of Fig. 1; Fig. 4 is a sectional veiw on line 4—4 of Fig. 3; and Fig. 5 is a sectional view on line 5—5 of Fig. 3.

The revolving head 1 of the wind mill is mounted to turn upon a collar 2 mounted upon and surrounding a suitably supported stationary upright tubular wind wheel mounting 3 through which is freely passed the upright reciprocating pump rod or load shaft 4.

The mill head is formed with horizontal bearings 6 for the horizontal wind wheel shaft 7 which carries the wheel of the mill. Two upright co-axial spur pinions 8, 8' of the same diameter are fixedly secured upon the shaft 7 and mesh with the co-axial upright spur gears 9, 9' of the same diameter. The spur gears 9, 9' are provided with hub portions 10, 10'. The hub portion 10 is in the form of a sleeve and turns in a bearing 11. The hub portion 10' is within and in telescopic relation to hub portion 10 and is provided with a narrow head 10² which is snugly passed through a correspondingly shaped opening in one end of hub portion 10 whereafter the two spur gears are turned 90° to place the part 10² in the holding position shown in Fig. 1. The two hub portions are maintained in the relation shown by the meshing of the pinions 8, 8' with the gears 9, 9'.

Coextensive and symmetrically related pitmen 12 are connected at their lower ends with the spur gears 9, 9' to be driven thereby, these pitmen terminating at their upper ends in bearings 13 through which a shaft 14 passes. An idler sheave 15 is provided upon the middle of the shaft 14 and is maintained spaced apart from the bearings 13 by the non-rotating spacing sleeves 16 through which the shaft 14 passes. The sleeves 16 are united by a yoke 17 for maintaining them in rigid relation and to which the upper end of the pump rod or load shaft is secured in order that it may be reciprocated by the pitmen. The parts 16 and 17 constitute a cross-head which takes part in coupling the upper ends of the pitmen with the load rod 4. As the sheave is co-axial with the shaft 14, it is also co-axial with the upper ends of the pitmen.

The sheave has a transversely curved annular groove in its periphery that receives the vertical sides or guiding rod portions of the guiding stirrup 18, whereby the upper ends of the pitmen are constrained to move in a vertical rectilinear path to impart similar movement to the pump rod or load shaft 4.

Hitherto the connection of the upper end of the load rod 4 with the cross-head was rigid. If the relatively moving parts are not accurately constructed or become worn, the cross-head is apt to rock slightly in the general direction of the travel of the load rod, causing undue strain upon the rigid connection between the load rod and cross-head, this strain increasing when the cross-head is in the lower part of its stroke. Fracture of the rigid union between the cross-head and load rod may consequently result. I avoid this possibility by providing a flexible union between the cross-head and the upper end of the load rod. This flexible union is desirably established by means of the horizontal shaft 19 which is passed through the cross-head and the upper end of the load rod. This shaft has a head 19' at one end and is provided with a key 20 through its other end whereby displacement of the shaft is avoided. The cross-head may turn slightly upon the shaft or the shaft may turn with the cross-head and in the upper end of the load rod, or both of these movements may occur, the shaft being positioned and serving to define an axis of relative turning movement of the cross-head and load rod which is in a plane that is angular and preferably prependicular to the planes of movement of the pitmen. The construction is such that the shaft 19 may be located slightly but sufficiently oblique to the vertical plane containing the guide rods (Fig. 3) to permit this shaft to clear these rods to be readily assembled with the cross-head and load rod after the other parts are assembled.

In Fig. 3 I have indicated the sheave 15 by dot and dash lines in a manner to show that it has full guiding contact with but one of the guide rods at a time. It will be observed that the sides of the peripheral groove in the sheave has lateral clearance from the guide rods received therein. This permits a slight canting of the sheave with respect to the common plane of the guide rods without impairing the guiding function and enables the shaft 14 to be slightly inclined as the upper pitmen ends move relatively in the general upright plane of movement of these pitmen ends and said shaft to compensate for inequalities of movement of the pitmen that may be forced by imperfections in construction. In Fig. 2 I have indicated clearances 15' between the hub of the sheave and the distance preserving portions 16 of the cross-head. This permits bodily movement of the sheave sidewise upon this shaft 14. The cross-head is thus permitted to weave to compensate for any misalignment of the connections of the pitmen with the spur gears, this weaving being readily permitted because of the flexible connection of the load rod with the cross-head.

Changes may be made without departing from my invention.

Having thus described my invention, I claim:

1. Power transmission gearing including two rotating members; two co-extensive and symmetrically related pitmen, each rotating member having a pitman individual thereto and in pivotal connection at one end therewith; a cross-head common to both pitmen and having pivotal connection therewith at the other ends thereof; a peripherally grooved sheave assembled with the cross-head and co-axial with the ends of the pitmen that have pivotal connection with the cross-head; guide rods received in the peripheral groove of the sheave, there being lateral clearance between the rods and the sides of the groove permitting canting of the sheave and permitting relative movement of the latter pitmen ends in the general upright plane of their movement without impairing the guiding function; and a load rod extending along and between the pitmen and having flexible connection with said cross-head defining an axis of relative movement between the load rod and cross-head that is angular to the general upright plane of movement of the latter pitmen ends.

2. Power transmission gearing including two rotating members; two co-extensive and symmetrically related pitmen, each rotating member having a pitman individual thereto and in pivotal connection at one end therewith; a cross-head common to both pitmen and having pivotal connection therewith at the other ends thereof, a peripherally grooved sheave assembled with the cross-head and co-axial with the ends of the pitmen that have pivotal connection with the cross-head; guide rods received in the peripheral groove of the sheave; a load rod extending along and between the pitmen; and a shaft coupling the cross-head and the adjacent end of the load rod and positioned to afford an axis of relative movement of the cross-head and load rod that is in a plane angular to the planes of movement of the pitmen.

3. Power transmission gearing including two rotating members; two co-extensive and symmetrically related pitmen, each rotating member having a pitman individual thereto and in pivotal connection at one end therewith; a cross-head common to both pitmen and having pivotal connection therewith at the other ends thereof; a peripherally grooved sheave assembled with the cross-head and co-axial with the ends of the pitmen that have pivotal connection with the cross-head; guide rods received in the peripheral groove of the sheave; a load rod extending along and between the pitmen; and a shaft coupling the cross-head and the adjacent end of the load rod and positioned to afford an axis of relative movement of the cross-head and load rod that is in a plane angular to the planes of movement of the pitmen, said shaft being also sufficiently oblique to the plane containing the aforesaid guide rods to permit the shaft to clear these rods.

In witness whereof, I hereunto subscribe my name.

DANIEL R. SCHOLES.